United States Patent
Powell-Lesnick

[19]

[11] Patent Number: 6,119,635
[45] Date of Patent: *Sep. 19, 2000

[54] PROTECTIVE CLOTHING FOR AN ANIMAL

[76] Inventor: Kathleen Powell-Lesnick, 4151 SW. 102nd Ave., Davie, Fla. 33328-2218

[ * ] Notice: This patent issued on a continued prosecution application filed under 37 CFR 1.53(d), and is subject to the twenty year patent term provisions of 35 U.S.C. 154(a)(2).

[21] Appl. No.: 09/009,471

[22] Filed: Jan. 20, 1998

[51] Int. Cl.[7] .............................. A01K 13/00; B68C 5/00
[52] U.S. Cl. ........................... 119/850; 54/79.1; 54/79.2; 54/79.4
[58] Field of Search ...................... 119/850, 868, 119/907; 54/79.1, 79.2, 79.3, 79.4; D30/145

[56] References Cited

U.S. PATENT DOCUMENTS

| | | | |
|---|---|---|---|
| 11,427 | 7/1854 | Ransom | 54/79.2 |
| D. 177,490 | 4/1956 | Bacon . | |
| D. 213,053 | 12/1968 | Church | D30/145 |
| 215,983 | 5/1879 | Simpson | 54/79.2 |
| D. 228,926 | 10/1973 | Bennett . | |
| D. 265,516 | 7/1982 | Wacker . | |
| D. 313,291 | 12/1990 | Shanley . | |
| D. 313,676 | 1/1991 | Indursky et al. . | |
| D. 352,370 | 11/1994 | Shover . | |
| D. 352,577 | 11/1994 | Shover . | |
| D. 361,174 | 8/1995 | Karlen . | |
| D. 372,563 | 8/1996 | Waugh, Jr. . | |
| D. 373,228 | 8/1996 | Brown . | |
| D. 379,687 | 6/1997 | Curtis . | |
| D. 383,258 | 9/1997 | Curtis | D30/145 |
| 441,249 | 11/1890 | Magraw | 54/79.2 |
| 1,196,203 | 8/1916 | Borbridge | 54/79.2 |
| 1,218,004 | 3/1917 | Sayles | 54/79.2 |
| 1,335,032 | 3/1920 | Seaton | 54/79.2 |
| 1,437,255 | 11/1922 | Mallinson | 54/79.2 |
| 2,003,435 | 6/1935 | Groff et al. | 54/79.1 |
| 2,131,495 | 9/1938 | Allen . | |
| 2,573,154 | 10/1951 | Low . | |
| 2,850,860 | 9/1958 | Torell et al. | 54/79.2 |
| 3,141,443 | 7/1964 | Huey . | |
| 3,248,852 | 5/1966 | Schwartz | 54/79.1 |
| 3,742,679 | 7/1973 | Jordan | 54/79.1 |
| 3,895,628 | 7/1975 | Adair | 119/850 X |
| 3,979,886 | 9/1976 | Johnson et al. | 54/79.2 |
| 4,355,600 | 10/1982 | Zielinski | 119/850 |
| 4,779,573 | 10/1988 | Vidal | 119/868 |
| 5,137,508 | 8/1992 | Engman | 119/850 X |
| 5,165,222 | 11/1992 | Cohen et al. . | |
| 5,359,963 | 11/1994 | Jesse, Jr. et al. | 119/850 |
| 5,361,563 | 11/1994 | Llamas | 54/79.2 |
| 5,463,985 | 11/1995 | Shover | 119/850 |
| 5,839,395 | 11/1998 | Kelley et al. | 119/850 |

*Primary Examiner*—Robert P. Swiatek
*Assistant Examiner*—James S. Bergin
*Attorney, Agent, or Firm*—Ted W. Whitlock

[57] ABSTRACT

A protective cover placed over the back of an animal to prevent the animal from removing a medicant placed on its back, prevents the animal from chewing or biting the area, and can also prevent sunburn. The protective cover substantially covers the back and sides of the animal, but is open on the underside of the animal to reduce a rise in body temperature when worn by the animal. The cover includes leg straps or loops for securing and positioning the article on the animal. Methods of use are also described.

5 Claims, 3 Drawing Sheets

PROTECTIVE CLOTHING FOR AN ANIMAL

FIELD OF THE INVENTION

The subject invention relates to articles of clothing for animals and, specifically, protective clothing for use on an animal with sensitive or allergically reactive skin.

BACKGROUND OF THE INVENTION

Articles of clothing adapted for wearing by an animal have long been used, especially for pets. However, the animal clothing articles heretofore available have been directed to clothing which protects the animal from cold and/or wet weather, protects a surgically traumatized or bandaged area, or retains shed hair. These protective animal clothing articles have been the subject of several patents. For example, including U.S. Pat. No. 4,355,600 describes a protective body covering for a four-legged mammal which will hold a bandage against its body and includes a tube of elastic fabric which substantially wraps around the entire body or torso of the animal.

Bandage protectors which substantially enwrap the torso or limb of an animal are described in U.S. Pat. Nos. 5,137,508 and 3,895,628.

Weather protective garments for animals have also been described. For example, a stretchable pet suit, including boots, is described in U.S. Pat. No. 3,742,679. A dog sweater for protecting a dog against inclement weather, i.e., cold or damp weather, is described in U.S. Pat. No. 5,359,963.

A significant limitation of such garments described above is that they do not protect the animal without providing a warming effect on the body of the animal. In other words, in warm climates, the known or described animal garments worn for the intended protective use may contribute to overheating of the animal.

In addition, certain animals, especially well-bred pets, may often have sensitive skin that results in discomfort, e.g., pruritic symptoms. In warm climates where fleas can live and be active year round, an animal with skin which is hypersensitive to fleas, or which has an allergy to fleas or their associated allergens, can be particularly susceptible to such discomfort. The animal may have a tendency to scratch, chew, or bite the area. These activities can result in the skin becoming raw or forming an open sore which can become infected. Medications which are useful to alleviate the symptoms of the uncomfortable skin condition are also licked or rubbed off by the animal before the medication can work its effect.

Animals can further be adversely affected by exposure to the sun. This is especially true for animals, such as dogs, having sensitive or allergic skin or which have their coats trimmed in a manner to expose the skin for show or other aesthetic purposes. However, available animal garments are primarily made to provide warmth for the animal. For example, the garments are made of a heavy, insulating fabric and generally enwrap the entire torso of the animal. These configurations are disadvantageous for protecting against the sun. In warm climates, they can cause the body temperature of the animal to rise, presenting a potential danger to the health of the animal.

Thus, there is a need to provide protection for an animal having sensitive skin, especially in warm climates where sun exposure or the presence of fleas is generally greater. Specifically, the animal needs protection against scratching, chewing, or biting the skin sensitive area; protection from licking or rubbing off medication; and protection from the sun, for example, sunburn, for sensitive skin animals.

BRIEF SUMMARY OF THE INVENTION

The subject invention concerns an article of manufacture and methods of use for protecting the skin of an animal. The article of the subject invention is useful for an animal having sensitive skin, for example, allergy to fleas, mites, pollen, or other allergen, or an animal which is susceptible to sunburn. The subject article can be used alone or in combination with a medicant or topical salve or ointment. Thus, it is an object of the invention to provide an article and method for protecting the skin of an animal having sensitive skin.

It is another object of the invention to provide an article and method for protecting damage to the skin of an animal having an allergy. The article is useful for preventing the animal from chewing or biting an area which is sensitive due to flea allergy.

It is yet another object of the invention to provide an article and method for preventing the animal from removing a topical ointment, salve, or other medicant applied to the sensitive skin area.

Another object of the invention is to provide an article and method for preventing sunburn on an animal.

These and other objects of the invention are achieved by the subject article comprising a cape-like covering for the back of the animal, wherein the cape-like covering comprises a substantially rectangular sheet of fabric or material which covers substantially the length of the torso of said animal. The rectangular sheet is secured in place on the animal by straps or loops at the four corners of the rectangular sheet. The straps or loops are placed around each of the respective limbs of the animal in order to hold the article in an appropriate position on the back of the animal. In a preferred embodiment, the article comprises two front straps or loops which can be configured as "sleeves" for placement over the front limbs of the animal. The rear straps or loops of this embodiment comprise elastic strips which can be easily placed over the rear limbs of the animal. Other configurations would be well-recognized by those of ordinary skill in the art in view of the description and drawings provided herein.

Advantageously, the subject invention provides an effective cover for the back of an animal which is protective for the skin of the back, easily positioned on the animal, comfortable, well-tolerated by the animal, and is easy and inexpensive to manufacture.

DETAILED DESCRIPTION OF THE PREFERRED EMBODIMENTS

Figure 1A:
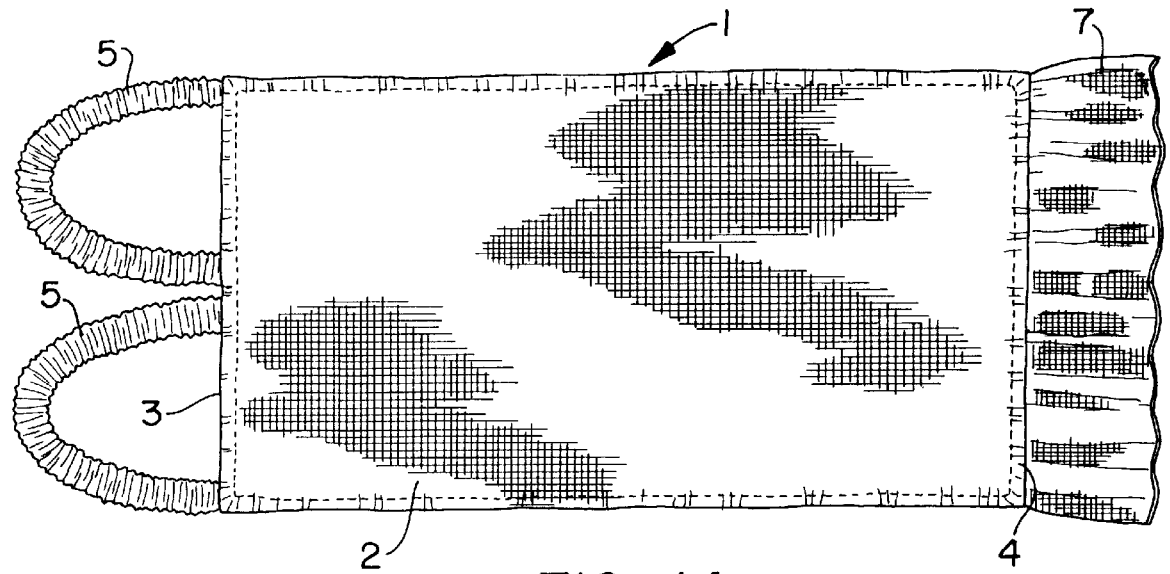
FIG. 1A shows a plan view of an outer face of an embodiment of the article of manufacture according to the subject invention.
Figure 1B:
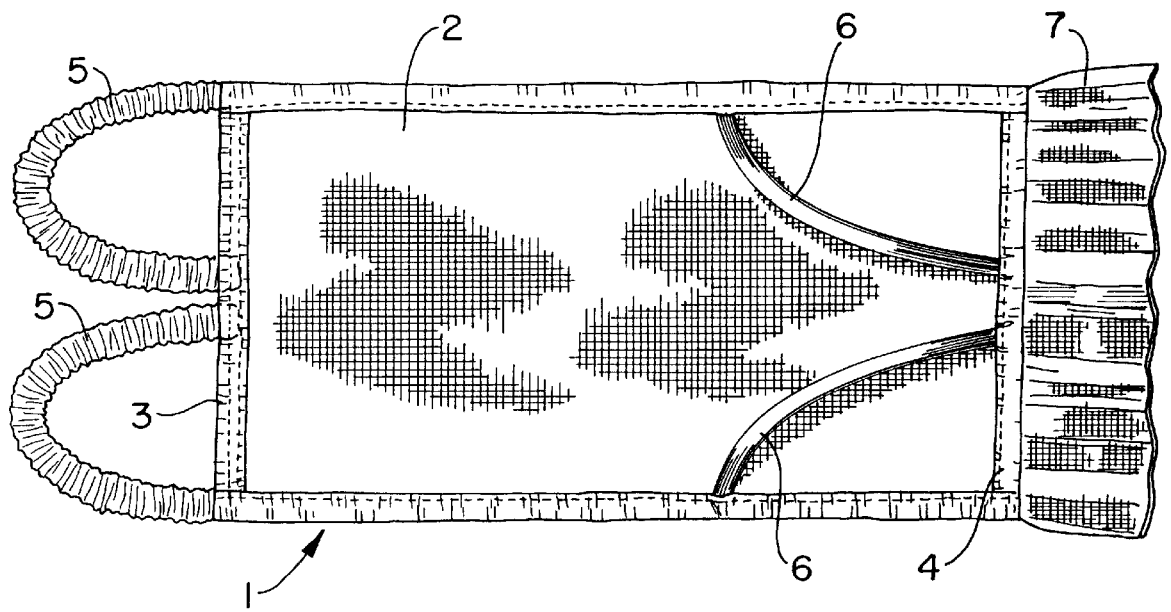
FIG. 1B shows a plan view of an inner face of an embodiment of the article of manufacture according to the subject invention.
Figure 3B:
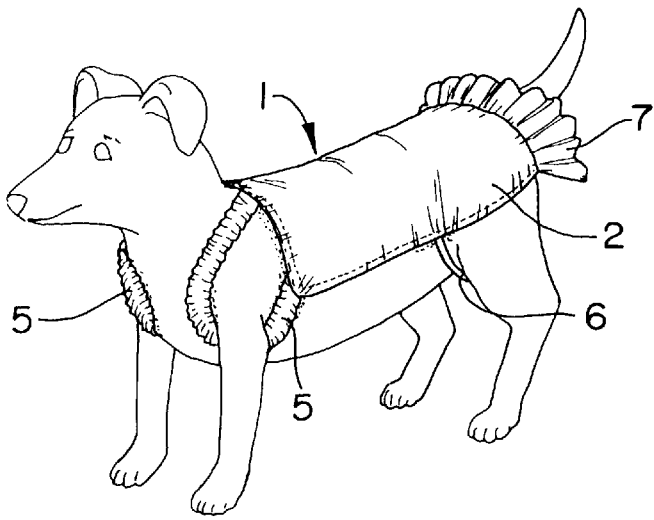
FIG. 3B shows an embodiment of the subject article of manufacture as worn on an animal.
Figure 3A:
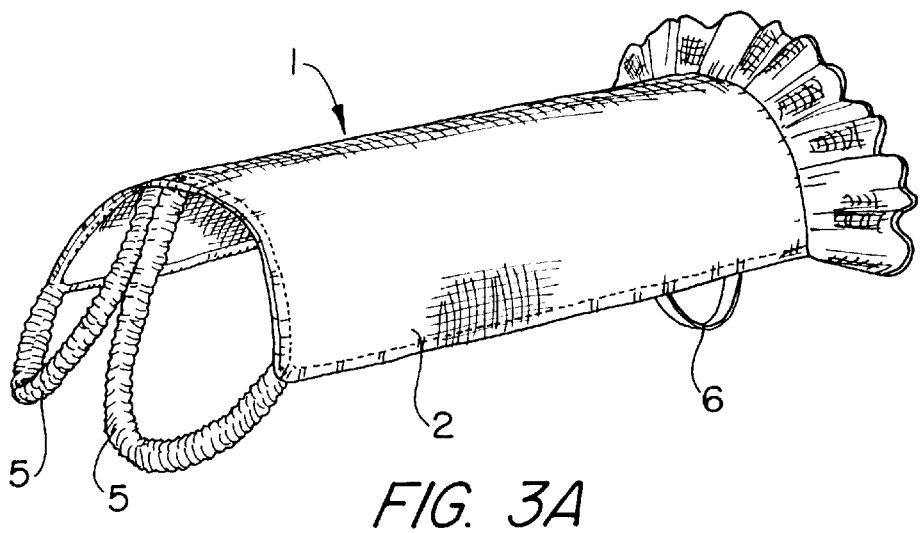
FIG. 3A shows a perspective view of an embodiment of the subject article of manufacture.
Figure 4:
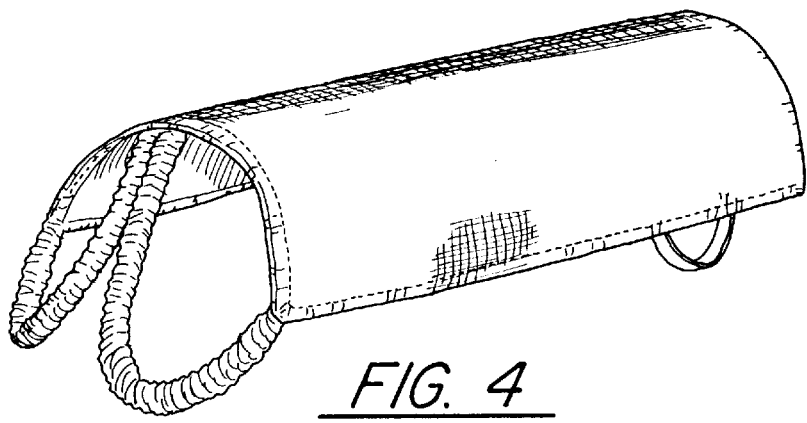
FIG. 4 shows a perspective view of an alternative embodiment of the article according to the subject invention.

A preferred embodiment of the subject invention is illustrated in FIGS. 3A–3B. In FIGS. 1A and 1B a protective cover 1 is shown comprising a substantially rectangular sheet 2 of fabric or material for placement over the back of an animal. The view shown in FIG. 1A is the outer side of the subject article which can be various colors or have various designs as desired. FIG. 1B is the underside of the subject article, i.e., the side which is placed in contact with the body of the animal. The rectangular sheet 2 of the protective cover 1 comprises a first end 3 which is configured to be placed toward the head of the animal, just behind the neck. A second end 4 of the rectangular sheet is configured to be placed at the tail end of the animal. At the head or front end 3 of the rectangular sheet 2, at each front corner, the sheet comprises a loop or strap 5 configured as a "sleeve" to be placed over a front limb of the animal. At each corner of the second end 4 of the rectangular sheet 2 is a strap or loop 6 to be placed over a rear limb of the animal.

FIGS. 1A and 1B also show an embodiment of the protective cover 1 comprising a ruffle extension 7 provided at the second end 4 of the rectangular sheet 2. The ruffle extension 7 advantageously extends past the end of the back and slightly over its tail, thereby adding protection over an area of the body of the animal that would not be protected by an article that ended at the tail. The ruffle can prevent the animal from chewing or biting the skin in the area where the tail meets the body, and enhances the aesthetics of the subject article.

Figure 2A:
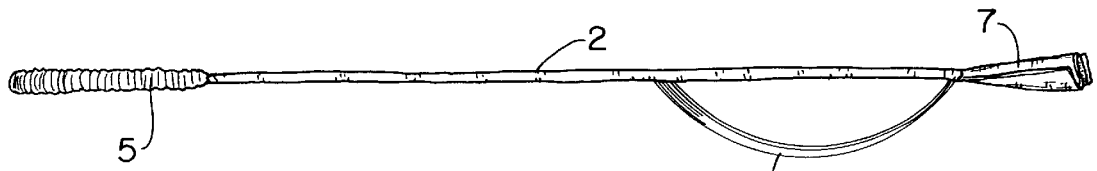
FIG. 2A shows a left side view of an embodiment of the subject article of manufacture.
Figure 2B:
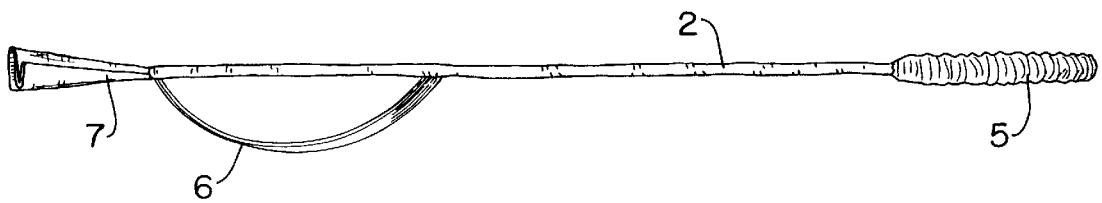
FIG. 2B shows a right side view of an embodiment of the subject article of manufacture.
Figure 2C:
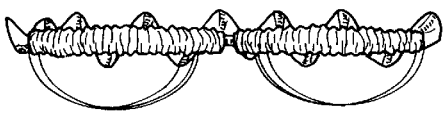
FIG. 2C shows a front end view of an embodiment of the subject article of manufacture.
Figure 2D:
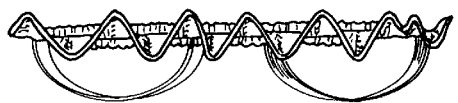
FIG. 2D shows a rear end view of an embodiment of the subject article of manufacture.

FIGS. 2A–2D show the subject article of manufacture in side and end views. FIGS. 2A and 2B are left and right side views, respectively, of the article showing the front strap 5 which are positioned around the front limbs of the animal; the rectangular sheet 2, which substantially covers the back of the animal; the straps 6 which are positioned around the rear limbs of the animal; and the ruffle 7, which provides additional protection for the tail area where it adjoins the body. This tail-body joint area is especially susceptible to skin problems due to a tendency for fleas to congregate in this area.

FIG. 3A is a perspective view of the subject article illustrating that the protective cover 1 conforms to the shape of the animal's back. Shown in the perspective view are the rectangular sheet 2 front limb strap 5, one of a pair of back limb straps 6, and the ruffle extension 7.

FIG. 3B illustrates the article in proper position as worn by the animal. The rectangular sheet 2 of the protective cover 1 is configured to be placed over the back of the animal, extending substantially along the sides of the animal, but remaining open on the underside of the animal. The front limb straps 5 and one of a pair of back limb straps 6 as placed over the limbs of the animal provide a means for securing the rectangular sheet in the appropriate position on the back and sides of the animal. The ruffle extension is shown to extend past the end of the back of the animal and to protect a portion of the tail.

In the preferred embodiment, the subject article is made from a substantially rectangular piece of fabric or material which is lightweight, generally non-insulating, and comfortable for the animal so that it is well tolerated. Most preferably, the fabric used to form the protective article is one which does not substantially raise the body temperature of the animal, e.g., a "breathable" natural fabric such as cotton or wool. It would be understood that other fabrics, including man-made fabrics such as polyester, or a blend of fabrics can be used. Certain are known for their long-lasting or washable characteristics and would be preferable for providing durable and easily maintainable protective covers. The subject protective cover preferably does not completely surround the torso of the animal, leaving an open or exposed area on the underside of the animal This can advantageously prevent a substantial rise in body temperature of the animal when the article is worn.

The sleeves and straps or loops (collectively "straps") of the article are preferably an elastic material which allows stretching of the strap to facilitate placement over the limb of the animal. In addition, the straps are of a length to fit comfortably around the limb in a manner which is tight enough to hold the subject protective cover in place, but not so tight as to restrict circulation to the limb. The straps can be affixed to the rectangular sheet in any manner which is recognized or acceptable in the art, e.g., the straps are preferably sewn to the rectangular sheet. Glueing, stapling, or other like means for affixing two pieces of fabric together can also be used, as would be understood to the ordinarily skilled artisan.

The subject protective cover has a plurality of uses and is preferably used for animals which have a flea allergy or other conditions caused by sensitive skin. For example, in a flea-allergic dog, topical medicants are often applied to the back of the dog in order to alleviate itching and to prevent or treat damage to the skin caused by the dog scratching, biting, or chewing the area. The subject protective cover can advantageously cover the topical medicant to prevent the dog from licking or rubbing off the applied medicant. The protective cover can also prevent further damage to the skin caused by scratching, biting, or chewing of the area by the animal. Thus, by placing the subject article on the back of an animal, for example, a dog, the animal is prevented from further irritating or traumatizing the area. Moreover, any medicant applied to the area can be maintained on the animal for a longer period of time in order to work its effect.

Another advantage of the subject invention is that the covering over the back of the animal can prevent sunburn. It is not commonly known by pet owners that animals can be severely affected by sunburn, especially dogs or other pets which have been trimmed or shaved so that the skin is exposed more than normal. Indoor pets which are rarely exposed to the harmful rays of the sun can become sunburned in a relatively short period of time, particularly when exposed in unshaded areas such as parks or beaches. The subject article, placed over the back of the animal, can prevent sunburn on the animal following exposure to the sun's harmful rays. In addition, because the material of the subject article is "breathable", i.e., relatively non-insulating, the article can provide shade for the animal and prevent excessive rise in body temperature while being worn. The protective cover of the subject invention leaves open or exposed the underside of the animal which further provides a cooling effect for the animal, i.e., preventing a rise in body temperature while the protective cover is being worn.

It should be understood that the examples and embodiments described herein are for illustrative purposes only and that various modifications or changes in light thereof will be suggested to persons skilled in the art and are to be included within the spirit and purview of this application and the scope of the appended claims.

What is claimed is:

1. An article of clothing for an animal, said article comprising a sheet of fabric which substantially covers the back and sides of the animal for protecting the skin of the animal, said fabric being a material which is substantially non-insulating and substantially open on the underside of the animal, said fabric and open underside preventing a substantial rise in body temperature of the animal when the article is being worn, said article further comprising a ruffled extension portion extending from the tail end of the article for extending past the torso at the tail end of the animal for protecting at least a portion of the tail area of the animal, wherein the extension portion is strapless such that it freely drapes over the tail such that the legs and rump of the animal are unencumbered by the extension portion.

2. The article of claim 1, wherein said sheet of fabric is substantially rectangular and comprises a strap or loop at each corner of said sheet for placing over a limb of the animal to maintain positioning of said article.

3. A method for preventing overheating of an animal, having sensitive or pruritic skin, and preventing harm to the skin on the animal's back and tail, said method comprising:

applying a medicant to the skin on the back of the animal;

covering said medicated skin area with a substantially rectangular sheet of a substantially non-insulating material having a strap at each corner of the sheet for placement over each limb of the animal, thereby holding the sheet in place, said rectangular sheet further comprising a ruffled extension portion extending from the tail end of the article which extends past the torso at the tail end of the animal to cover at least a portion of the tail of the animal, wherein the extension portion is strapless such that it freely drapes over the tail such that the legs and rump of the animal are unencumbered by the extension portion.

4. A method for preventing sunburn on an animal said method comprising:

providing a substantially rectangular sheet of a substantially non-insulating material having straps or loops at each corner of the sheet for placement over each limb of the animal, thereby holding the sheet in place, said rectangular sheet further comprising a ruffled extension portion extending from the tail end of the article which extends past the torso at the tail end of the animal to cover at least a portion of the tail of the animal, wherein the extension portion is strapless such that it freely drapes over the tail such that the legs and rump of the animal are unencumbered by the extension portion; and placing said rectangular sheet over the back of the animal while leaving the underside of the animal uncovered.

5. A method for preventing an animal from removing a medicant applied to the back and tail area of the animal, wherein said method comprises the steps of providing a substantially rectangular sheet of a substantially non-insulating material having straps or loops at each corner of said sheet for placement over a limb of an animal, said rectangular sheet further having a ruffled extension portion extending from the tail end of the article which extends past the torso at the tail end of the animal to cover at least a portion of the tail of the animal, wherein the extension portion is strapless such that it freely drapes over the tail such that the legs and rump of the animal are unencumbered by the extension portion, and;

placing said rectangular sheet over the back and portion of the tail of the animal while leaving the underside of the animal uncovered.

* * * * *